(12) United States Patent
Giffard-Burley

(10) Patent No.: US 11,803,843 B2
(45) Date of Patent: Oct. 31, 2023

(54) ARTWORK TRANSACTION METHOD AND ARTWORK TRANSACTION APPARATUS AND COMPUTER PROGRAM THEREFOR

(71) Applicant: Wacom Co., Ltd., Saitama (JP)

(72) Inventor: Joss Daniel Giffard-Burley, Frome (GB)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/405,945

(22) Filed: Aug. 18, 2021

(65) Prior Publication Data
US 2021/0374734 A1    Dec. 2, 2021

Related U.S. Application Data

(63) Continuation of application No. PCT/JP2020/041205, filed on Nov. 4, 2020.

(30) Foreign Application Priority Data

Nov. 8, 2019  (JP) .............................. 2019-203436
Apr. 1, 2020  (JP) .............................. 2020-066189

(51) Int. Cl.
*G06Q 20/38* (2012.01)
*G06Q 20/40* (2012.01)

(52) U.S. Cl.
CPC ..... *G06Q 20/3825* (2013.01); *G06Q 20/3827* (2013.01); *G06Q 20/3829* (2013.01); *G06Q 20/40145* (2013.01)

(58) Field of Classification Search
CPC .......... G06Q 20/3825; G06Q 20/3827; G06Q 20/3829; G06Q 20/40145; G06Q 30/0601;
(Continued)

(56) References Cited

U.S. PATENT DOCUMENTS 10,250,381 B1 *  4/2019  Rice .......................... H04L 9/30
10,469,487 B1 * 11/2019  Griffin ................... H04L 9/3242
(Continued)

FOREIGN PATENT DOCUMENTS

CN    107730384 A    2/2018
JP    2019-502177 A  1/2019
(Continued)

OTHER PUBLICATIONS

International Search Report, dated Feb. 2, 2021, for International Application No. PCT/JP2020/041205, 9 pages.
(Continued)

*Primary Examiner* — Patrick McAtee
*Assistant Examiner* — Vincent I Idiake
(74) *Attorney, Agent, or Firm* — Seed IP Law Group LLP

(57) ABSTRACT

An artwork transaction method, an artwork transaction apparatus, and a program therefor are provided, which allow for secure transaction of artwork on a network using computers. The artwork transaction method includes using a computer to receive the artwork and biometric signature data. The artwork transaction method includes using the computer to issue, to a contract account on a blockchain network, an exhibition transaction that includes information used for identifying the artwork and includes the biometric signature data.

33 Claims, 11 Drawing Sheets

(58) Field of Classification Search
CPC .......... G06Q 2220/00; G06Q 20/02; G06Q 20/1235; G06F 21/10; G06F 21/16; G06F 21/64; G06F 21/32; H04L 9/08; H04L 9/32

See application file for complete search history.

(56) References Cited

U.S. PATENT DOCUMENTS

| | | | |
|---|---|---|---|
| 2007/0276823 A1* | 11/2007 | Borden | G06F 16/1756 707/999.005 |
| 2014/0222607 A1* | 8/2014 | Drouin | G06Q 30/0643 705/26.25 |
| 2015/0058202 A1* | 2/2015 | Dahaeck | G06F 21/10 726/28 |
| 2016/0162961 A1* | 6/2016 | Moshe | G06Q 30/0607 705/26.25 |
| 2017/0116693 A1 | 4/2017 | Rae et al. | |
| 2017/0243179 A1* | 8/2017 | Dehaeck | H04L 63/08 |
| 2017/0353309 A1 | 12/2017 | Gray | |
| 2018/0227370 A1 | 8/2018 | Robles et al. | |
| 2019/0366475 A1* | 12/2019 | Scarselli | H04L 9/30 |
| 2020/0311646 A1* | 10/2020 | Koenig | H04L 9/0643 |

FOREIGN PATENT DOCUMENTS

| | | |
|---|---|---|
| JP | 2019-524018 A | 8/2019 |
| JP | 2019-531540 A | 10/2019 |
| WO | WO-2018032890 A1 * 2/2018 | ......... G06F 16/1834 |
| WO | 2019/175427 A1 | 9/2019 |

OTHER PUBLICATIONS

Delgado-Mohatar et al., "Biometric Template Storage with Blockchain: A First Look into Cost and Performance Tradeoffs," Escuela Politecnica Superior Universidad Autonoma de Madrid, Madrid, Spain, 2019 IEEE/CVF Conference on Computer Vision and Pattern Recognition Workshops, 9 pages.

Extended European Search Report, dated Oct. 6, 2022, for European Application No. 20883815.1-1213 / 3998540, 9 pages.

Kaga et al., "A Secure and Practical Signature Scheme for Blockchain Based on Biometrics," National Institute of Advance Industrial Science and Techonlogy, Tokyo, Japan, Shizuoka University, Shizuoka, Japan, 15 pages.

Wang et al., "ArtChain: Blockchain-enabled Platform for Art Marketplace," Blockchain Innovation Centre Swinburne University of Technology, 2019 IEEE International Conference on Blockchain (Blockchain), 8 pages.

Office Action, dated Jan. 13, 2023, for Chinese Patent Application No. 202080007502.0. (10 pages).

European Communication, dated Jul. 25, 2023, for European Patent Application No. 20 883 815.1-1213. (7 pages).

Impedovo et al., "Automatic Signature Verification: The State of the Art," *IEEE Transactions on Systems, Man, and Cybernetics—Part C: Applications and Reviews* 38(5)609-635, Sep. 2008.

* cited by examiner

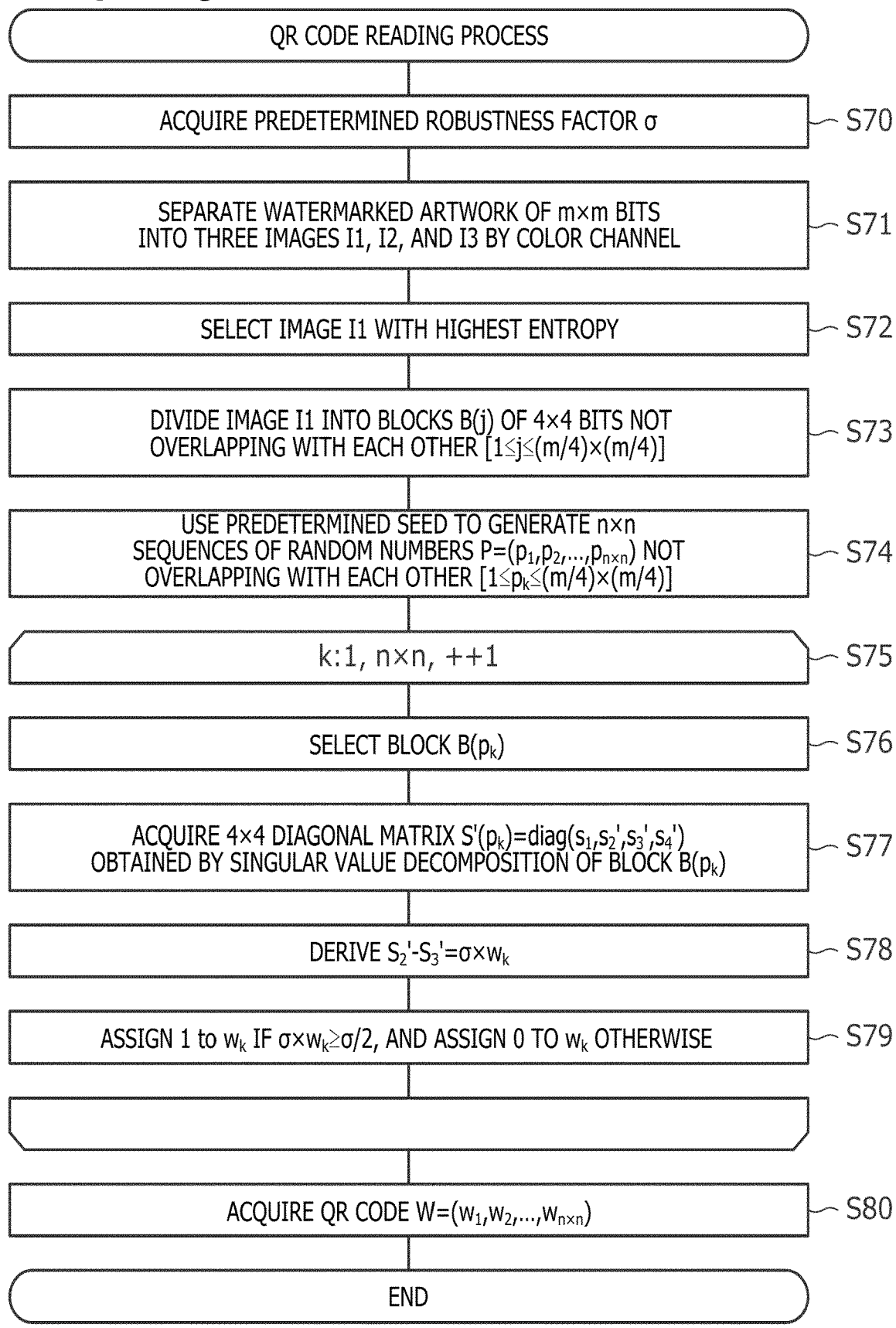

ARTWORK TRANSACTION METHOD AND ARTWORK TRANSACTION APPARATUS AND COMPUTER PROGRAM THEREFOR

BACKGROUND

Technical Field

The present disclosure relates to a transaction method and a transaction apparatus of artwork, and a computer program therefor.

Description of the Related Art

In recent years, various services are introduced based on smart contracts whose validity can be guaranteed by a blockchain. For example, a smart contract may be used by a bank to lend money, as disclosed in Patent Document 1.

PRIOR ART DOCUMENT

Patent Document

Patent Document 1: JP-T-2019-524018

BRIEF SUMMARY

Technical Problem

However, it is difficult to securely trade artwork such as a digital painting drawn on a tablet terminal using a conventional smart contract. Specifically, the conventional smart contract cannot guarantee that the exhibitor of the artwork is the artist himself or herself and cannot guarantee that the artwork has not been altered after the initial exhibition. In addition, once the artwork is sold and then placed in a black market, the conventional smart contract cannot determine the original purchaser of the artwork who has released the artwork into the black market.

Therefore, an aspect of the present disclosure is related to providing a transaction method and a transaction apparatus of artwork and a computer program that uses a smart contract to securely trade artwork.

Technical Solution

The present disclosure provides a transaction method of artwork executed by a computer. The transaction method includes a first reception step of using the computer to receive the artwork and biometric signature data. The transaction method also includes an exhibition transaction issue step of using the computer to issue, to a contract account on a blockchain network, an exhibition transaction including information used for identifying the artwork and including the biometric signature data.

The present disclosure provides an artwork transaction apparatus. The transaction apparatus includes a reception unit (or circuit) that receives the artwork and biometric signature data, and a first transaction issue unit (circuit) that issues, to a contract account on a blockchain network, an exhibition transaction including information used for identifying the artwork and including the biometric signature data.

The present disclosure provides a computer program for artwork, which causes a computer to function as a transaction apparatus of artwork. The program causes the computer to execute a first reception step of receiving the artwork and biometric signature data, and an exhibition transaction issue step of issuing, to a contract account on a blockchain network, an exhibition transaction including information used for identifying the artwork and including the biometric signature data.

Advantageous Effect

According to the present disclosure, a smart contract can be used to securely trade artwork.

BRIEF DESCRIPTION OF THE SEVERAL VIEWS OF THE DRAWINGS

FIG. 13 is a process flow diagram illustrating a process of reading a QR code® from watermarked artwork generated in the QR code® embedding process illustrated in FIG. 12.

DETAILED DESCRIPTION

Hereinafter, embodiments of the present disclosure will be described in detail with reference to the attached drawings.

Figure 1:
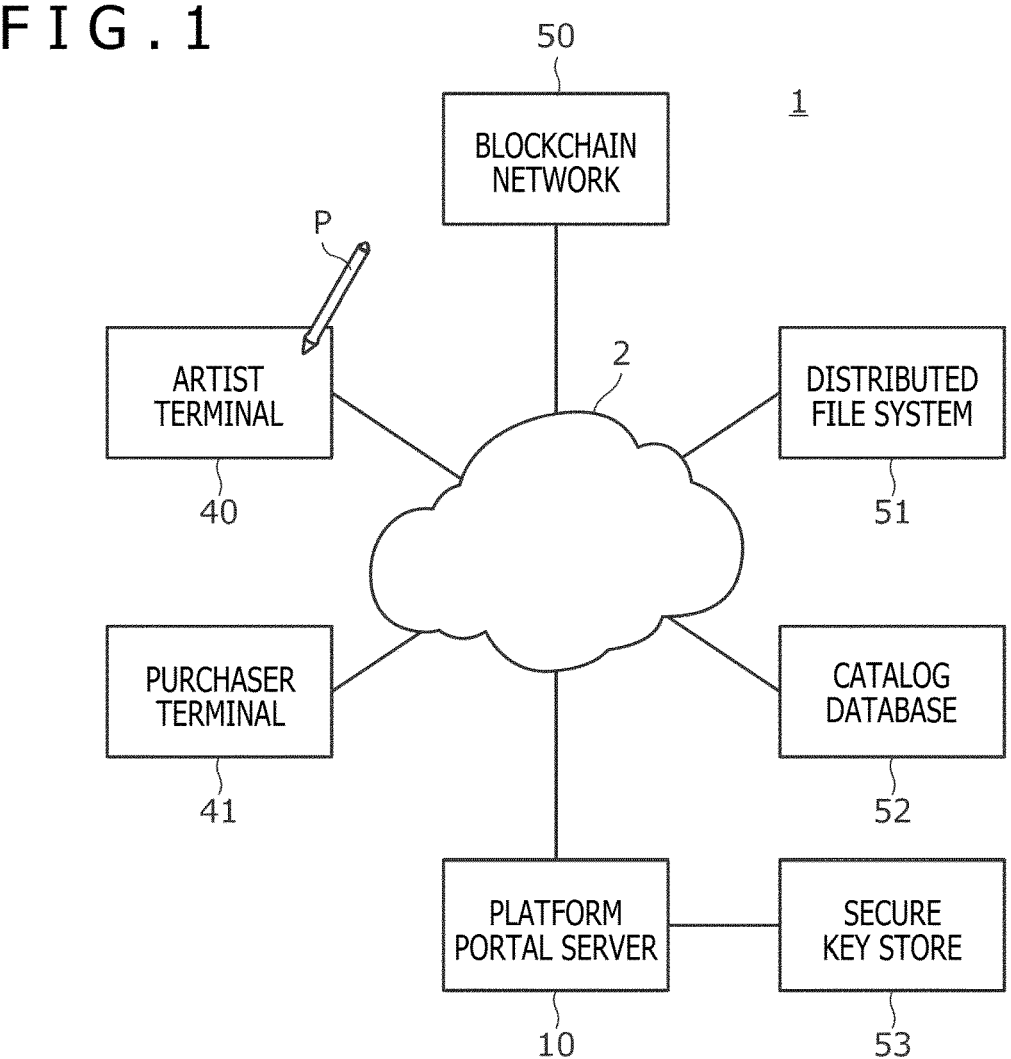
FIG. 1 is a diagram illustrating a configuration of an artwork transaction system 1 according to an embodiment of the present disclosure.

FIG. 1 is a diagram illustrating a configuration of an artwork transaction system 1 according to an embodiment. As illustrated in FIG. 1, the artwork transaction system 1 includes a platform portal server 10, an artist terminal 40, a purchaser terminal 41, a blockchain network 50, a distributed file system 51, and a catalog database 52 that are connected to each other through a network 2. In addition, a secure key store 53 is connected to the platform portal server 10.

Figure 2:
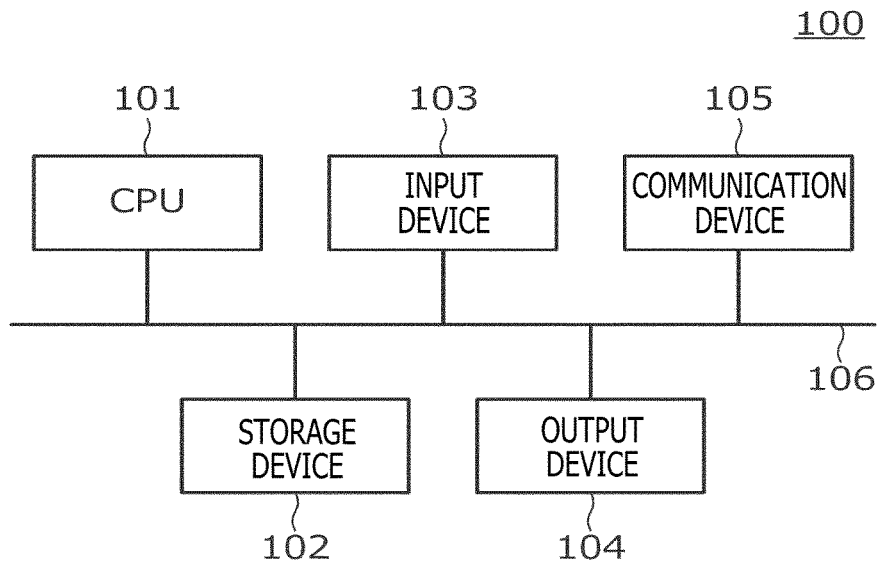
FIG. 2 is a diagram illustrating an example of a hardware configuration of a platform portal server 10, an artist terminal 40, and a purchaser terminal 41.

FIG. 2 is a diagram illustrating an example of a hardware configuration of the platform portal server 10, the artist terminal 40, and the purchaser terminal 41. The platform portal server 10, the artist terminal 40, and the purchaser terminal 41 may each comprise a computer 100 having an illustrated configuration.

As illustrated in FIG. 2, the computer 100 includes a CPU (Central Processing Unit) 101, a storage device 102, an input device 103, an output device 104, and a communication device 105.

The CPU 101 is a device that controls various components of the computer 100 and that reads and executes various programs stored in the storage device 102. The CPU 101 of the platform portal server 10 executes the programs stored in the storage device 102 to execute various processes described below with reference to FIGS. 6 to 13.

The storage device 102 includes a main storage device, such as a DRAM (Dynamic Random Access Memory), and an auxiliary storage device, such as a hard disk. The storage device 102 stores various programs for executing an operating system of the computer 100 and various applications, and stores data used by the programs.

The input device 103 is a device that receives and supplies an input operation of a user to the CPU 101. The input device 103 may include, for example, a keyboard, a mouse, and a touch detection device. The touch detection device is a device including a touch sensor and a touch controller and is used to detect pen input or touch input.

The output device 104 is a device that outputs a processing result of the CPU 101 to the user. The output device 104 may include, for example, a display and a speaker. The communication device 105 is a device that communicates with an external device. The communication device 105 transmits and receives data according to an instruction of the CPU 101. The respective communication devices 105 communicate with each other to realize transmission and reception of data between the platform portal server 10, the artist terminal 40, and the purchaser terminal 41.

Returning to FIG. 1, the artist terminal 40 is a computer used by an artist to input and exhibit artwork and to input biometric signature data to be described later. The artwork and the biometric signature data are each digital data, and the artist uses a pen P to perform pen input to the input device 103 of the artist terminal 40, thereby generating the artwork and the biometric signature data. A specific process for exhibiting the artwork will be described later.

Figure 3:
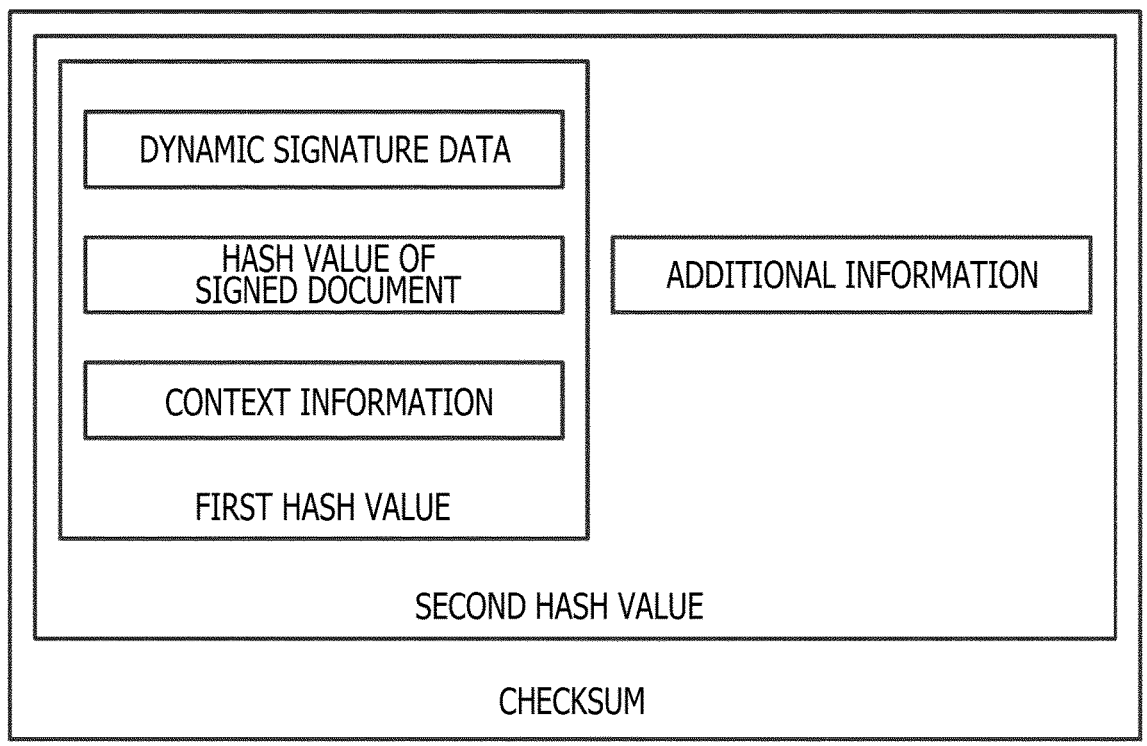
FIG. 3 is a diagram illustrating a configuration of biometric signature data.

FIG. 3 is a diagram illustrating a configuration of the biometric signature data. The biometric signature data is data generated according to, for example, WILL (Wacom Ink Layer Language)™ or FSS (Forensic Signature Stream)™ protocols. As illustrated in FIG. 3, the biometric signature data includes dynamic signature data; a hash value of a signed document; context information; additional information; a first hash value of the dynamic signature data, the signed document, and the context information; a second hash value of the above-described first hash value and the additional information; and a checksum for detecting an error that may occur in transmitting and receiving the second hash value.

The dynamic signature data is digital ink data including a series of coordinate data forming a drawn line. Each piece of the coordinate data is data indicating the position of the pen P detected by the abovementioned touch detection device. The detection process will be described in detail. The touch sensor includes a plurality of X electrodes extending in a Y-direction and arranged at equal intervals in an X-direction and includes a plurality of Y electrodes extending in the X-direction and arranged at equal intervals in the Y-direction. In a case where the pen P can transmit signals, the plurality of X electrodes and the plurality of Y electrodes each receive a burst signal transmitted by the pen P, and the touch controller acquires coordinate data indicating the position of the pen P. On the other hand, in a case where the pen P cannot transmit signals, the touch controller sequentially transmits signals to the plurality of X electrodes, and the plurality of Y electrodes receive the signals. The touch controller detects amplitude changes of the received signals to acquire coordinate data indicating the position of the pen P. The touch controller is configured to collect the coordinate data at a frequency of, for example, 100 or 200 times a second.

The dynamic signature data may include a pen pressure value and pen angle data in addition to the coordinate data. The pen pressure value represents the pressure applied to the pen tip of the pen P. A built-in sensor of the pen P detects the pen pressure value, and the pen P supplies the pen pressure value to the touch sensor.

Figure 4:
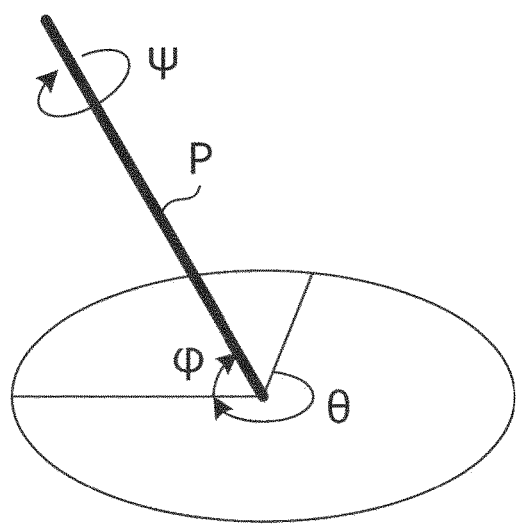
FIG. 4 is a diagram describing pen angle data.

FIG. 4 is a diagram describing the pen angle data. The pen angle data is data detected by the built-in sensor or the touch sensor of the pen P, and the pen angle data includes an azimuth angle $\theta$, a tilt angle $\varphi$, and a rotation angle $\psi$ as illustrated in FIG. 4.

Returning to FIG. 3, the hash value of the signed document is a hash value of electronic data of a document (e.g., an exhibition application or a contract document) signed by the artist to generate biometric signature data. Note that the hash value is a value obtained by inputting the target electronic data to a predetermined one-way hash function. This is similar to other hash values to be described below.

The context information is information including name data of the signing artist, date and time of the signature, a purpose of the signature, information regarding the touch detection device used for the signature (such as the manufacturer name and the model name/number), information regarding an application used for the signature (such as the application name and the version information), information regarding an operating system of the artist terminal 40 (such as the operating system name and the version information), address information of the artist terminal 40 (such as the IP (Internet Protocol) address or the MAC (Media Access Control) address), and the like. The additional information may include any information that can be designated or defined by the administrator of the artwork transaction system 1, other than the dynamic signature data, the hash value of the signed document, and the context information.

Returning to FIG. 1, the purchaser terminal 41 is a computer used by the purchaser to purchase artwork (e.g., artwork exhibited by the artist). A specific processing of the purchase will be described later.

The blockchain network 50 is a network of a plurality of computers connected to each other on a peer-to-peer basis and is configured to record a transaction of a smart contract in a blockchain. Specifically, an example of the blockchain network 50 includes an Ethereum network. The transaction is recorded in the blockchain by some computers (hereinafter referred to as "miners") connected to the blockchain network 50.

Specifically, each block of the blockchain includes a block header and data (transaction data) indicating specific details of the transaction. The block header includes a Merkle root, which is data obtained by compressing the size of the transaction data, includes a hash value of an immediately preceding block, and includes a nonce value that is any character string. A rule is set in the blockchain network 50 such that, in order to connect a new block to the blockchain, the hash value of the block needs to satisfy a predetermined condition (for example, a condition that the value starts from "000"). Therefore, the miners that try to record a block in the blockchain perform an operation (mining) of finding a nonce value in a round-robin manner such that the hash value of the block header of the block satisfies the predetermined condition. As a result of the operation, the miner that successfully discovers the nonce value at the earliest time connects the block to the blockchain, and in this way, the recording of the transaction in the blockchain is completed.

The distributed file system 51 is a network of a plurality of computers connected to each other on a peer-to-peer basis and is configured to store any electronic data. A specific example of the distributed file system 51 includes an IPFS (InterPlanetary File System). The electronic data stored in the distributed file system 51 is identified by a hash value of the electronic data. That is, in the distributed file system 51, the hash value of the stored electronic data functions as address information of the electronic data. In the present embodiment, the distributed file system 51 is used for storing encrypted artwork.

The catalog database 52 is a database installed on one or a plurality of computers. In the present embodiment, the catalog database 52 is used for storing a catalog of artwork (information necessary for artwork sale). The catalog database 52 may be installed in the platform portal server 10.

The secure key store 53 is a database that stores encryption keys used for encryption of data, and is preconfigured so as to accept or allow access only from the platform portal server 10. In the present embodiment, the secure key store 53 is used for storing public keys 1 and 2, secret keys 1 and 2, and data encryption keys 1 and 2 to be described later.

The platform portal server 10 is a computer that functions as a transaction apparatus of artwork, and the platform portal server 10 plays a role of accepting exhibition of artwork by the artist and supporting (realizing) a purchase of the exhibited artwork.

Figure 5:
FIG. 5 is a diagram illustrating input and output of data to and from the platform portal server 10.

FIG. 5 is a diagram illustrating input and output of data to and from the platform portal server 10. First, in a stage of accepting the exhibition of artwork, the platform portal server 10 accepts exhibition of artwork from the artist terminal 40. The exhibition includes a main body of the artwork (for example, digital image data in a raster format, such as a JPEG file, or digital image data in a vector format, such as a digital ink file) and sale conditions (charged or not charged, the price if charged, and the like). It may be preferable to indicate the price in a virtual currency (such as Ether) realized by the blockchain network 50. The platform portal server 10 also receives input of the abovementioned biometric signature data from the artist terminal 40. The platform portal server 10 that has received the exhibition and the biometric signature data records a transaction indicating the exhibition (the exhibition transaction) in the blockchain network 50. Specific details of the exhibition transaction will be described later.

The platform portal server 10 that has accepted the exhibition of the artwork uses the data encryption key 1 corresponding to a common key of a common key cryptosystem to encrypt the artwork main body, and stores the artwork main body in the distributed file system 51. In addition, the platform portal server 10 generates a pair of a public key 1 and a secret key 1 corresponding to a public key and a secret key in a public key cryptosystem, and uses the public key 1 to encrypt the data encryption key 1. Further, the platform portal server 10 stores the pair of the public key 1 and the secret key 1 and the encrypted data encryption key 1 in the secure key store 53. Note that the reason that the artwork main body is encrypted by the data encryption key 1 instead of the public key 1 is that large-sized data such as artwork may not be able to be encrypted by the public key in the public key cryptosystem.

The platform portal server 10 further registers, in the catalog database 52, a thumbnail of the exhibited artwork, sale conditions, and an ID (identification information) of the exhibition transaction recorded in the blockchain network 50, and returns the ID of the exhibition transaction and the secret key 1 to the artist terminal 40. The returned ID of the exhibition transaction is used by the artist to refer to the blockchain network 50 and to check the details of the exhibition of the artist. In addition, the secret key 1 is used by the artist to extract the artwork of the artist from the distributed file system 51.

Next, in a stage of realizing the purchase of the exhibited artwork, the platform portal server 10 receives a purchase request from the purchaser terminal 41. The purchase request includes purchaser information indicating the purchaser (e.g., an account on the blockchain network 50, the purchaser's name, and the like), information indicating the artwork selected by the purchaser, and the purchase price (e.g., information indicating an amount in a virtual currency). The platform portal server 10 that has received the purchase request records a transaction indicating the purchase (purchase transaction) in the blockchain network 50. Specific details of the purchase transaction will be described later.

The platform portal server 10 that has received the purchase request extracts the secret key 1 and the data encryption key 1 from the secure key store 53 and extracts the artwork from the distributed file system 51. The platform portal server 10 then uses the secret key 1 to decode the data encryption key 1 and uses the decoded data encryption key 1 to decode the artwork.

The platform portal server 10 further embeds a watermark into the decoded artwork to generate watermarked artwork. The platform portal server 10 uses the data encryption key 2 to encrypt the watermarked artwork and stores the watermarked artwork in the distributed file system 51. The watermark is generated based on an ID (identification information) of the purchase transaction, which will be described in detail later.

The platform portal server 10 also generates a pair of a public key 2 and a secret key 2 corresponding to a public key and a secret key in the public key cryptosystem, and uses the public key 2 to encrypt the data encryption key 2. The platform portal server 10 then stores the pair of the public key 2 and the secret key 2 and the encrypted data encryption key 2 in the secure key store 53. Note that the reason that the watermarked artwork is encrypted by the data encryption key 2 instead of the public key 2 is that the size of the watermarked artwork is large, as in the case of the exhibition.

Subsequently, the platform portal server 10 executes a process of returning the ID of the purchase transaction, the secret key 2, and the hash value of the artwork with encrypted watermark to the purchaser terminal 41, and executes a process of transmitting, to the artist terminal 40, the ID of the purchase transaction and the purchase proceeds. The ID of the purchase transaction returned to each terminal is used by the purchaser and the artist to refer to the blockchain network 50 and to check the details of the purchase. In addition, the secret key 2 and the hash value of the artwork with encrypted watermark are used by the purchaser to extract the purchased artwork from the distributed file system 51 and to decode the artwork.

Figure 6:
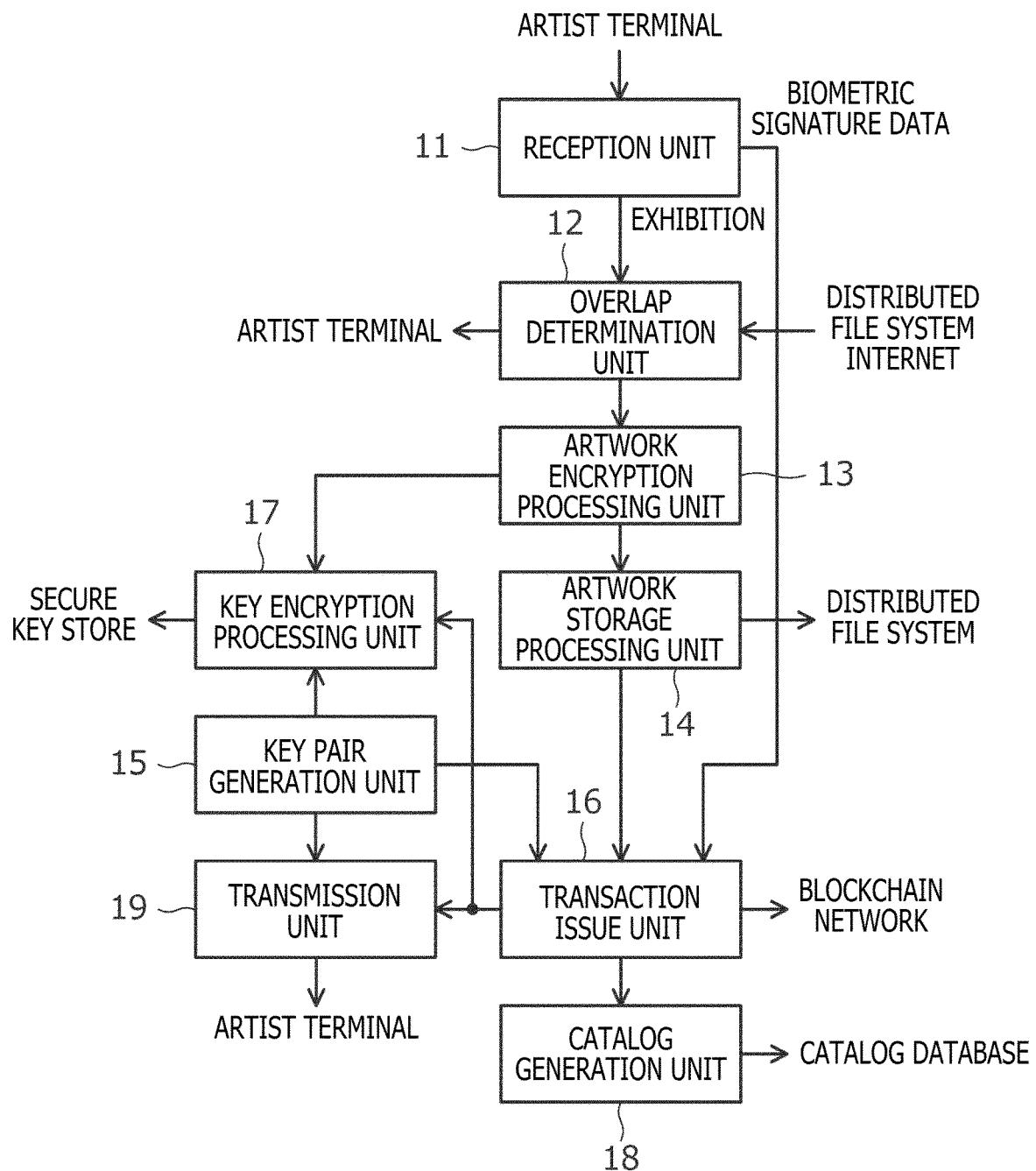
FIG. 6 is a functional block diagram of the platform portal server 10 in relation to exhibition of artwork.
Figure 7:
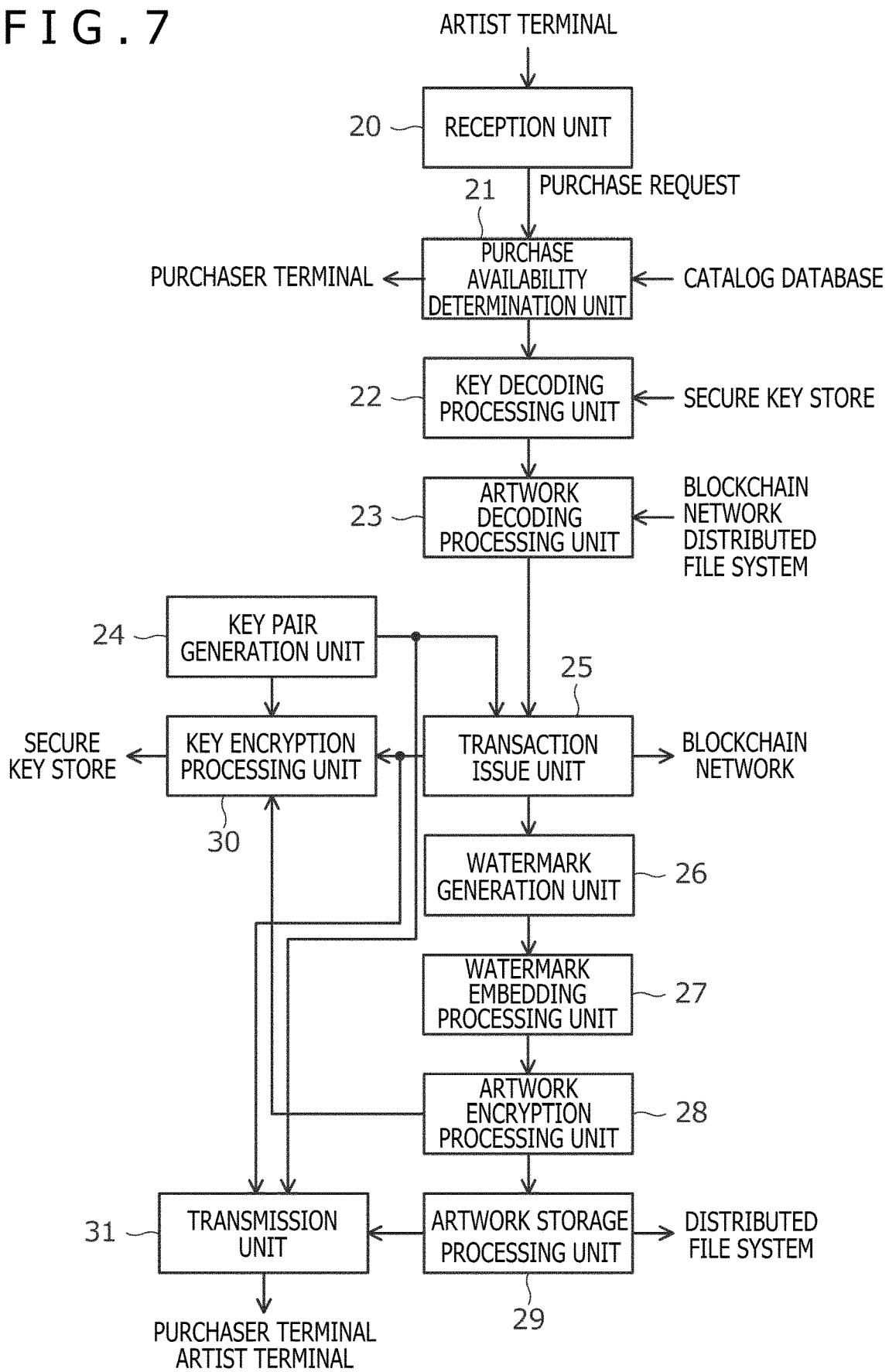
FIG. 7 is a functional block diagram of the platform portal server 10 in relation to sales of the artwork.

FIGS. 6 and 7 are functional block diagrams of the platform portal server 10. FIG. 6 illustrates functional blocks of the platform portal server 10 in relation to the exhibition of the artwork, and FIG. 7 illustrates functional blocks of the platform portal server 10 in relation to the sale of the artwork. Hereinafter, the functional blocks of the platform portal server 10 will be described in detail with reference to FIGS. 6 and 7.

First, with reference to FIG. 6, the platform portal server 10 includes, as functional blocks regarding the exhibition of the artwork, a reception unit (or circuit) 11, an overlap determination unit (circuit) 12, an artwork encryption processing unit (circuit) 13, an artwork storage processing unit (circuit) 14, a key pair generation unit (circuit) 15, a transaction issue unit (circuit) 16, a key encryption processing unit (circuit) 17, a catalog generation unit (circuit) 18, and a transmission unit (circuit) 19.

The reception unit 11 receives exhibition of artwork from the artist terminal 40. The exhibition includes the main body of the artwork and the information regarding the sale conditions as described above.

The overlap determination unit 12 determines whether or not the exhibited artwork overlaps with other artwork (that is, whether or not the exhibited artwork is unique). The determination may be carried out by, for example, comparing the exhibited artwork with the artwork stored in the past in the distributed file system 51 by the platform portal server 10, by comparing the exhibited artwork with images obtained by search on the Internet, or by carrying out both, for example. As a result of the comparison, if other artwork overlapping with the exhibited artwork is not discovered, the overlap determination unit 12 determines that there is no overlap, and causes the reception unit 11 to further receive the abovementioned biometric signature data from the artist terminal 40. On the other hand, if other artwork overlapping with the exhibited artwork is discovered, the overlap determination unit 12 determines that there is an overlap, and returns an exhibition rejection to the artist terminal 40.

The artwork encryption processing unit 13 encrypts the artwork if the overlap determination unit 12 determines that there is no overlap. Specifically, the artwork encryption processing unit 13 first generates the data encryption key 1 corresponding to the common key in the common key cryptosystem. The artwork encryption processing unit 13 then uses the generated data encryption key 1 to encrypt the artwork.

The artwork storage processing unit 14 executes a process of storing the artwork encrypted by the artwork encryption processing unit 13 in the distributed file system 51 and acquires the hash value of the artwork.

The key pair generation unit 15 generates a pair of the public key 1 and the secret key 1 corresponding to the public key and the secret key in the public key cryptosystem.

The transaction issue unit 16 generates an exhibition transaction including the hash value of the encrypted artwork acquired by the artwork storage processing unit 14, the biometric signature data received by the reception unit 11, and the public key 1 generated by the key pair generation unit 15, and issues the exhibition transaction to a contract account (to be described below) of the blockchain network 50. Subsequently, any one of the miners connected to the blockchain network 50 completes recording of the exhibition transaction in the blockchain.

The key encryption processing unit 17 uses the public key 1 generated by the key pair generation unit 15 to encrypt the data encryption key 1, and stores the data encryption key 1 in the secure key store 53 along with the pair of the public key 1 and the secret key 1 in association with the ID of the exhibition transaction issued by the transaction issue unit 16.

The catalog generation unit 18 generates a thumbnail of the exhibited artwork and registers the thumbnail in the catalog database 52 along with the sale conditions and the ID of the exhibition transaction. In this way, the exhibited artwork is registered in the catalog database 52, and thus, the purchaser can refer to the catalog database 52 to select artwork to be purchased.

The transmission unit 19 returns the ID of the exhibition transaction issued by the transaction issue unit 16 and the secret key 1 generated by the key pair generation unit 15 to the artist terminal 40. In this way, the artist can check the exhibition transaction on the blockchain network 50 and can acquire and decode the encrypted artwork stored in the distributed file system 51 to check the original artwork.

The check of the original artwork by the artist will be described in more detail. The artist uses the artist terminal 40 to transmit the ID of the exhibition transaction and the secret key 1 to the platform portal server 10. The platform portal server 10 refers to the blockchain network 33 based on the ID of the exhibition transaction received from the artist terminal 40, to acquire the hash value of the encrypted artwork. The platform portal server 10 then uses the acquired hash value to access the distributed file system 51 and reads the encrypted artwork. The platform portal server 10 also uses the ID of the exhibition transaction received from the artist terminal 40 to read the encrypted data encryption key 1 from the secure key store 53, and uses the secret key 1 received from the artist terminal 40 to decode the encrypted data encryption key 1. Lastly, the platform portal server 10 uses the decoded data encryption key 1 to decode the encrypted artwork and thereby acquire the artwork and returns the artwork to the artist terminal 40. In this way, the artist can check the artwork.

Next, with reference to FIG. 7, the platform portal server 10 includes, as functional blocks regarding the sale of the artwork, a reception unit (circuit) 20, a purchase availability determination unit (circuit) 21, a key decoding processing unit (circuit) 22, an artwork decoding processing unit (circuit) 23, a key pair generation unit (circuit) 24, a transaction issue unit (circuit) 25, a watermark generation unit (circuit) 26, a watermark embedding processing unit (circuit) 27, an artwork encryption processing unit (circuit) 28, an artwork storage processing unit (circuit) 29, a key encryption processing unit (circuit) 30, and a transmission unit (circuit) 31.

The reception unit 11 receives a purchase request indicating an intent to purchase artwork, from the purchaser terminal 41. The purchase request includes the purchaser information, the information indicating the artwork selected by the purchaser, and the price, etc., as described above.

The purchase availability determination unit 21 determines whether or not the purchase request is approvable. Specifically, the purchase availability determination unit 21 first reads the corresponding sale conditions of the artwork and the ID of the exhibition transaction from the catalog database 52. The purchase availability determination unit 21 then compares the read sale conditions with the details of the purchase request and determines whether or not the purchase request is approvable, based on the result of the comparison. For example, when the sale conditions define that the price of the artwork is 1 Ether, the purchase availability determination unit 21 determines that the purchase request is approvable (grantable) if the purchase request includes 1 Ether. On the other hand, if the purchase request does not include 1 Ether, the purchase availability determination unit 21 determines that the purchase request is not approvable (grantable). In the latter case, the purchase availability determination unit 21 returns a purchase rejection to the purchaser terminal 41.

The key decoding processing unit 22 reads the secret key 1 and the encrypted data encryption key 1 from the secure key store 53 based on the ID of the exhibition transaction.

The key decoding processing unit 22 then uses the read secret key 1 to decode the read encrypted data encryption key 1.

The artwork decoding processing unit 23 refers to the blockchain network 50 based on the ID of the exhibition transaction, to acquire the hash value of the encrypted artwork. The artwork decoding processing unit 23 then reads the encrypted artwork from the distributed file system 51 based on the acquired hash value and uses the data encryption key 1 decoded by the key decoding processing unit 22, to decode the encrypted artwork.

The key pair generation unit 24 generates a pair of the public key 2 and the secret key 2 corresponding to the public key and the secret key in the public key cryptosystem.

The transaction issue unit 25 generates a purchase transaction including the purchaser information included in the purchase request, the ID of the exhibition transaction read by the purchase availability determination unit 21 from the catalog database 52, the amount of money indicating the purchase amount of the artwork, and the public key 2 generated by the key pair generation unit 24, and issues the purchase transaction to the contract account (to be described later) of the blockchain network 50. Subsequently, any one of the miners connected to the blockchain network 50 completes the recording of the purchase transaction in the blockchain.

The watermark generation unit 26 generates a watermark based on the ID of the purchase transaction issued by the transaction issue unit 25. The watermark generated in this way may be, for example, a QR code® indicating the ID of the purchase transaction. The watermark embedding processing unit 27 executes a process of embedding the watermark into the artwork decoded by the artwork decoding processing unit 23, to generate watermarked artwork. Details of the process will be described in detail below with reference to FIG. 12.

The artwork encryption processing unit 28 generates a data encryption key 2 corresponding to a common key in the common key cryptosystem and uses the generated data encryption key 2 to encrypt the watermarked artwork. The artwork storage processing unit 29 executes a process of storing the watermarked artwork encrypted by the artwork encryption processing unit 28 in the distributed file system 51 and acquires the hash value of the watermarked artwork.

The key encryption processing unit 30 uses the public key 2 generated by the key pair generation unit 24 to encrypt the data encryption key 2, and stores the data encryption key 2 in the secure key store 53 in association with the ID of the purchase transaction issued by the transaction issue unit 25.

The transmission unit 31 returns the ID of the purchase transaction, the hash value acquired by the artwork storage processing unit 29, and the secret key 2 generated by the key pair generation unit 24 to the purchaser terminal 41, and transmits the ID of the purchase transaction and the proceeds to the artist terminal 40. In this way, the purchaser and the artist can check the purchase transaction on the blockchain network 50. In addition, the purchaser can acquire and decode the artwork with encrypted watermark stored in the distributed file system 51, to acquire the purchased artwork in the watermarked state.

The acquisition of the artwork by the purchaser will be described in more detail. The purchaser uses the purchaser terminal 41 to transmit the hash value of the artwork with encrypted watermark, the ID of the purchase transaction, and the secret key 2 to the platform portal server 10. The platform portal server 10 uses the hash value received from the purchaser terminal 41 to access the distributed file system 51 and reads the artwork with encrypted watermark. The platform portal server 10 also reads the encrypted data encryption key 2 from the secure key store 53 based on the ID of the purchase transaction received from the purchaser terminal 41, and uses the secret key 2 received from the purchaser terminal 41 to decode the encrypted data encryption key 2. Lastly, the platform portal server 10 uses the decoded data encryption key 2 to decode the artwork with encrypted watermark and thereby acquire the watermarked artwork, and returns the watermarked artwork to the purchaser terminal 41. In this way, the purchaser can acquire the watermarked artwork.

FIGS. 8 to 12 are process flow diagrams illustrating processes executed by the platform portal server 10. Hereinafter, the processes executed by the platform portal server 10 will be described in more detail with reference to FIGS. 8 to 12.

Figure 8:
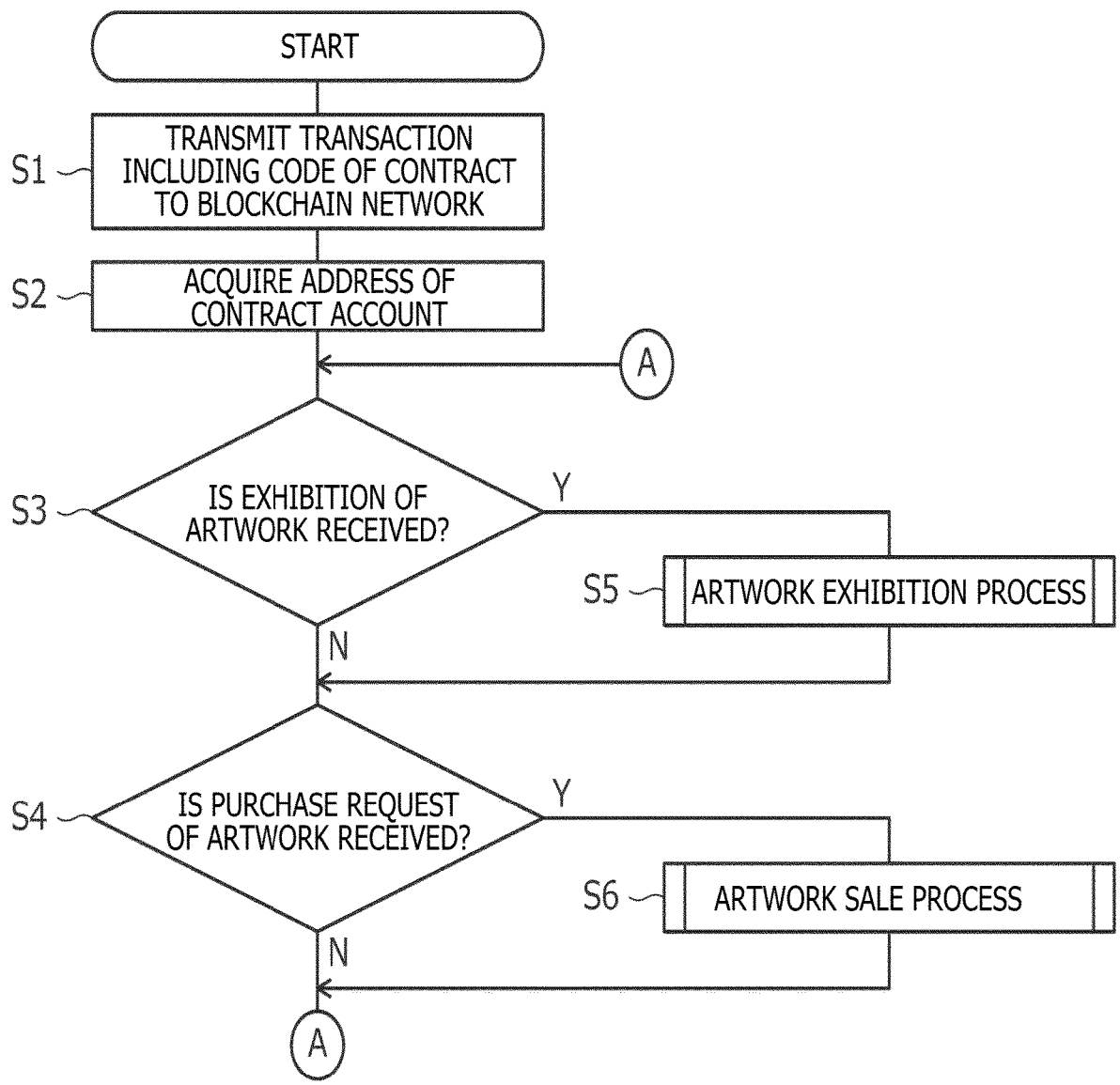
FIG. 8 is a process flow diagram illustrating a process executed by the platform portal server 10.

First, with reference to FIG. 8, the platform portal server 10 first executes a process of generating an account (a contract account) on (of) the blockchain network 50 to allow the blockchain network 50 to record the exhibition and the purchase of the artwork in the blockchain network 50. Specifically, the platform portal server 10 transmits a transaction including a code of a contract to the blockchain network 50 (step S1) and acquires an address of a contract account generated as a result of the transmission (step S2).

Subsequently, the platform portal server 10 repetitively executes a process of determining whether or not exhibition (submission) of artwork is received from the artist terminal 40 (step S3) and a process of determining whether or not a purchase request of artwork is received from the purchaser terminal 41 (step S4).

If the platform portal server 10 determines that exhibition of artwork is received in step S3, the platform portal server 10 executes an artwork exhibition process (step S5). In addition, if the platform portal server 10 determines that a purchase request of artwork is received in step S4, the platform portal server 10 executes an artwork sale process (step S6).

Figure 9:
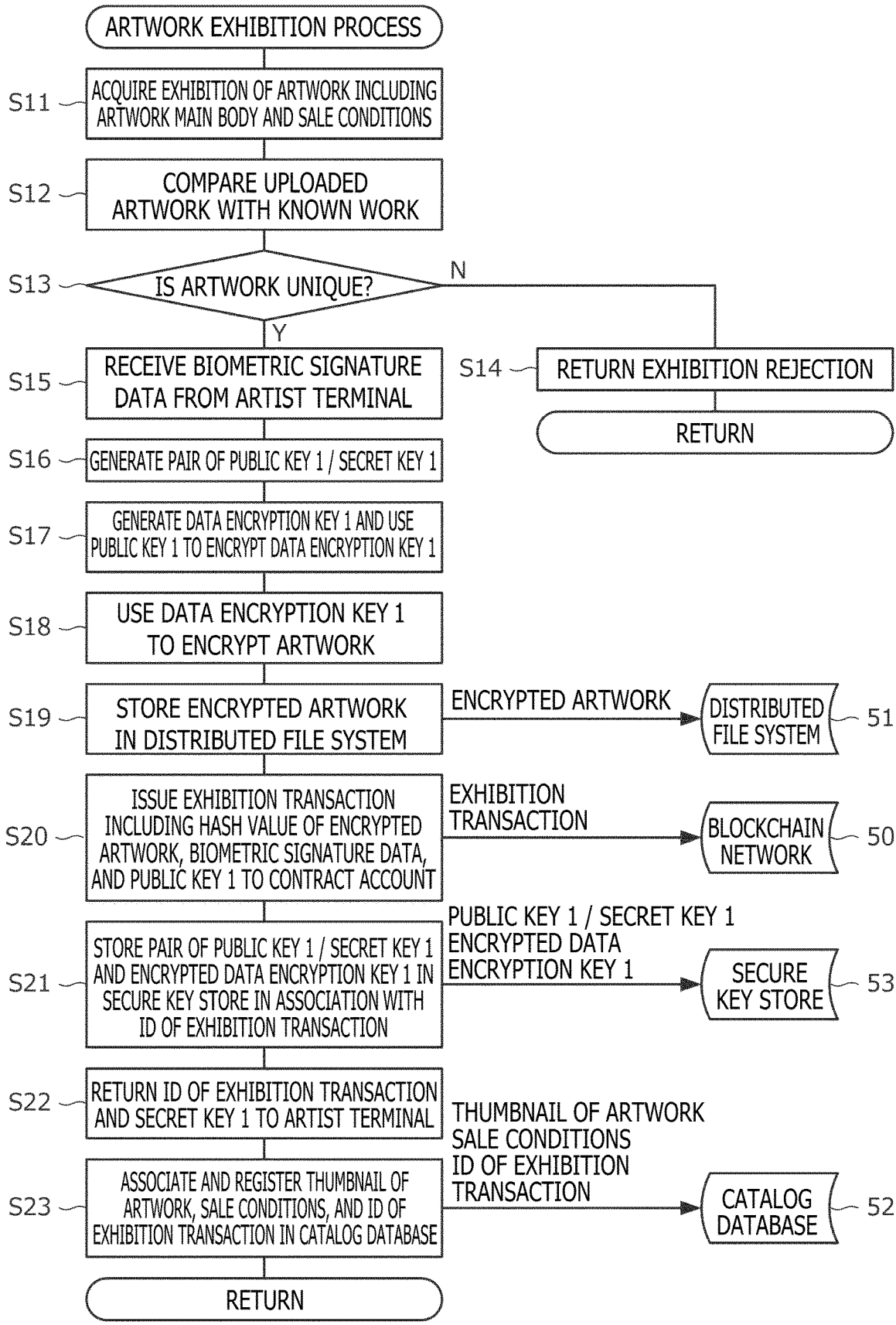
FIG. 9 is a diagram illustrating details of an artwork exhibition process executed in step S5 of FIG. 8.

FIG. 9 is a diagram illustrating details of the artwork exhibition process executed in step S5 of FIG. 8. As illustrated in FIG. 9, the platform portal server 10 that has started the artwork exhibition process acquires the exhibition of the artwork including the artwork main body and the sale conditions (step S11). Further, the platform portal server 10 compares the uploaded artwork with known work (step S12). The details of the comparison are as described above.

The platform portal server 10 determines whether or not the artwork is unique, based on the result of the comparison executed in step S12 (step S13). As a result, if the platform portal server 10 determines that the artwork is not unique, the platform portal server 10 returns an exhibition rejection to the artist terminal 40 and then ends the artwork exhibition process (step S14). On the other hand, if the platform portal server 10 determines that the artwork is unique, the platform portal server 10 receives biometric signature data from the artist terminal 40 (step S15). Specifically, for example, the platform portal server 10 displays a screen for prompting the artist to place a signature on the display of the artist terminal 40 and lets the artist input the dynamic signature data. The artist terminal 40 adds each piece of information described with reference to FIG. 3 to the dynamic signature data inputted in this way, to generate biometric signature data, and transmits the biometric signature data to the platform portal server 10.

Next, the platform portal server 10 generates a pair of the public key 1 and the secret key 1 (step S16). In addition, the platform portal server 10 generates a data encryption key 1 and uses the public key 1 to encrypt the data encryption key 1 (step S17).

Next, the platform portal server 10 uses the data encryption key 1 to encrypt the artwork (step S18) and stores the encrypted artwork in the distributed file system 51 (step S19). Subsequently, the platform portal server 10 issues an exhibition transaction including the hash value of the encrypted artwork, the biometric signature data, and the public key 1 to the contract account generated in steps S1 and S2 of FIG. 8 (step S20).

The platform portal server 10 that has executed step S20 stores the pair of the public key 1 and the secret key 1 and the data encryption key 1 encrypted in step S17 in the secure key store 53 in association with the issued ID of the exhibition transaction (step S21). Further, the platform portal server 10 returns the ID of the exhibition transaction and the secret key 1 to the artist terminal 40 (step S22), and associates and registers the thumbnail of the artwork, the sale conditions, and the ID of the exhibition transaction in the catalog database 52 (step S23). The platform portal server 10 then ends the artwork exhibition process.

Figure 10:
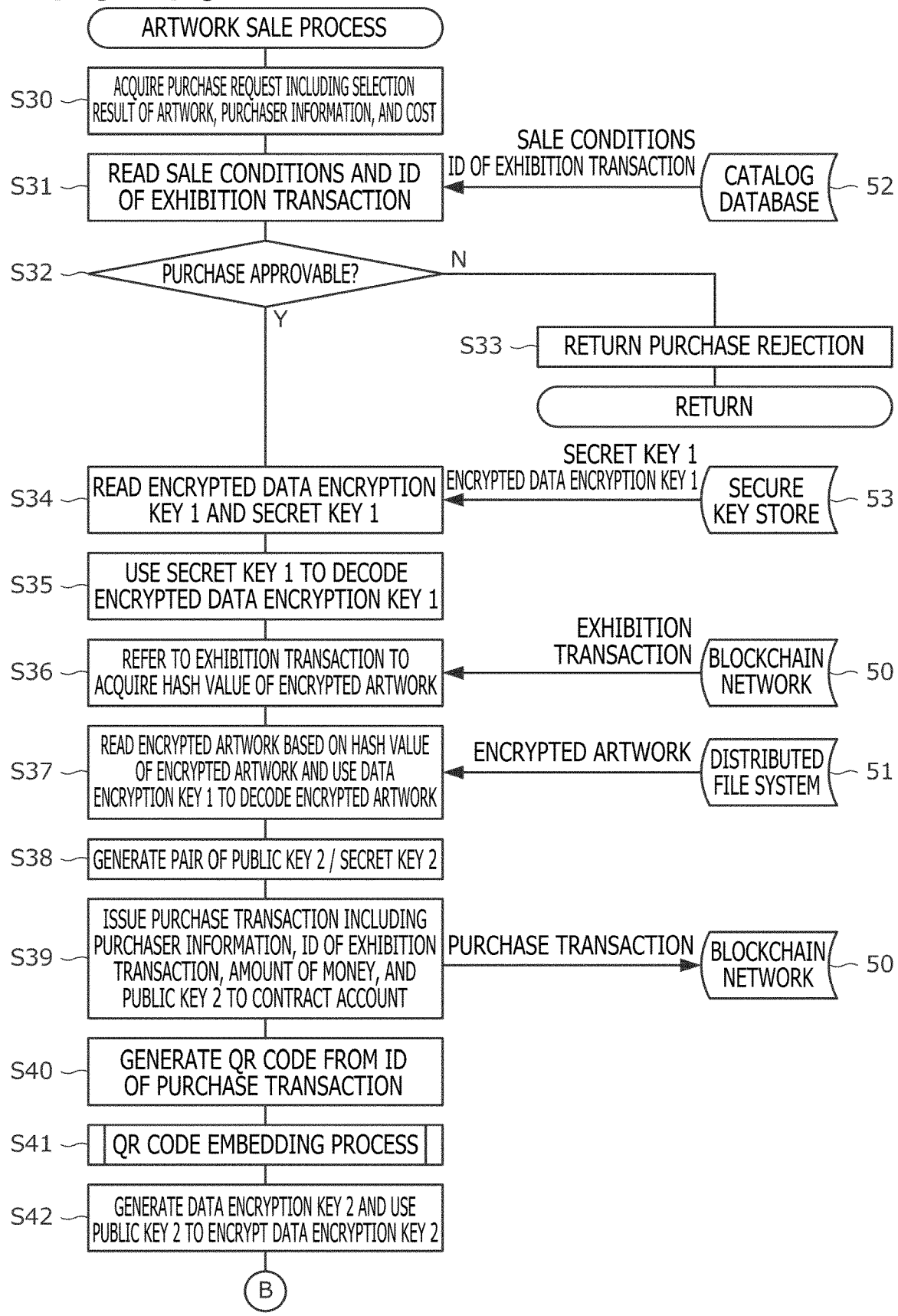
FIG. 10 is a diagram illustrating details of an artwork sale process executed in step S6 of FIG. 8.
Figure 11:
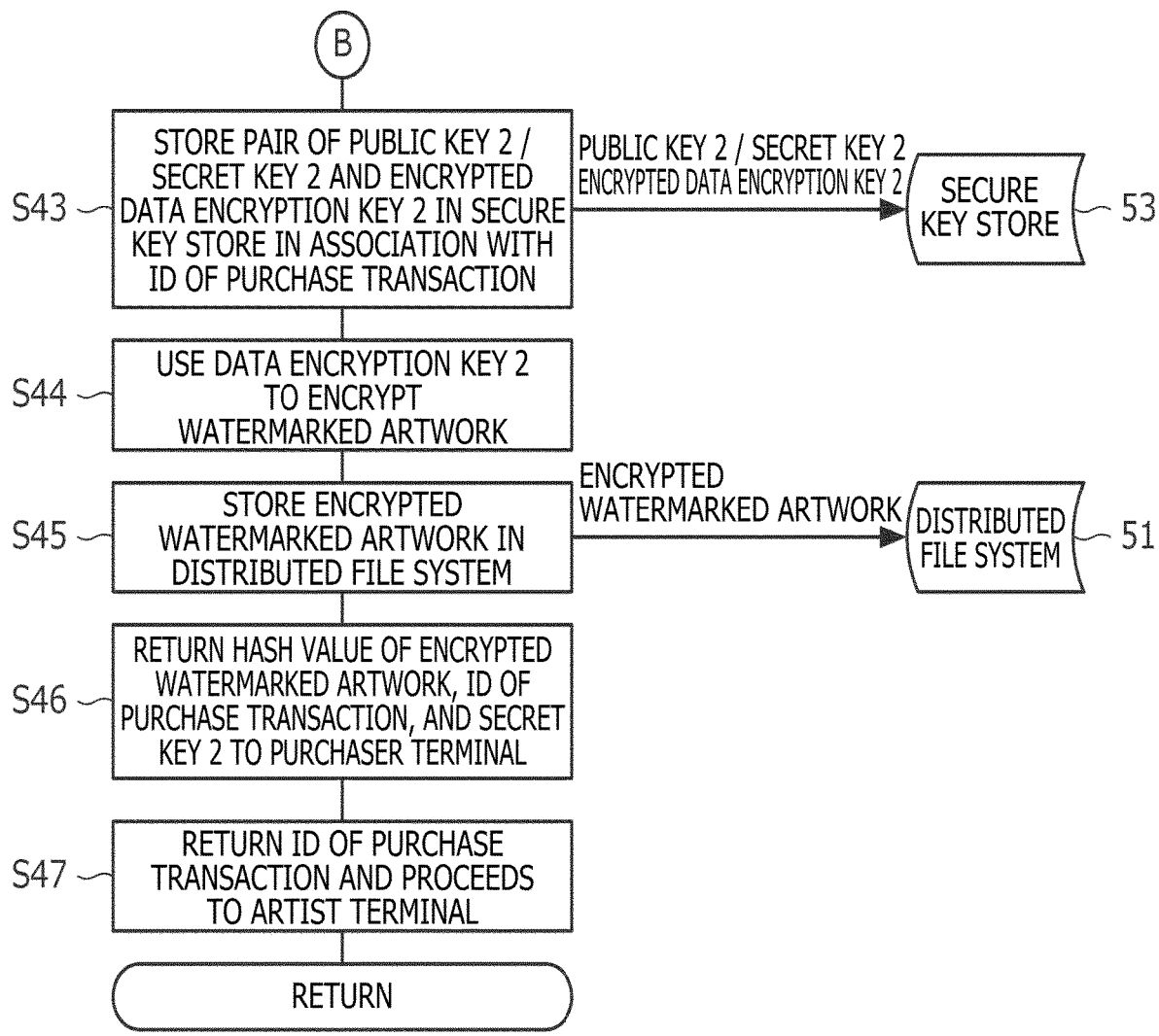
FIG. 11 is a diagram illustrating the details of the artwork sale process executed in step S6 of FIG. 8.

FIGS. 10 and 11 are diagrams illustrating details of the artwork sale process executed in step S6 of FIG. 8. As illustrated in FIGS. 10 and 11, the platform portal server 10 that has started the artwork sale process acquires a purchase request including the selection result of the artwork, the purchaser information, and the price in the catalog database 52 (step S30). Further, the platform portal server 10 reads the sale conditions and the ID of the exhibition transaction from the catalog database 52 (step S31) and determines whether or not the purchase request is approvable (step S32). The details of the determination are as described above.

If the platform portal server 10 determines that the purchase is not approvable in step S32, the platform portal server 10 returns a purchase rejection to the purchaser terminal 41 and then ends the artwork sale process (step S33). On the other hand, if the platform portal server 10 determines that the purchase is approvable, the platform portal server 10 first reads the secret key 1 and the encrypted data encryption key 1 from the secure key store 53 based on the ID of the exhibition transaction (step S34) and uses the read secret key 1 to decode the read encrypted data encryption key 1 (step S35).

Next, the platform portal server 10 refers to the exhibition transaction in the blockchain network 50 to acquire the hash value of the encrypted artwork (step S34). The platform portal server 10 then reads the encrypted artwork from the distributed file system 51 based on the acquired hash value, and uses the data encryption 1 acquired in step S35, to decode the encrypted artwork (step S37).

Subsequently, the platform portal server 10 reads the encrypted data encryption key 1 from the secure key store 53 based on the storage location acquired in step S34 and uses the secret key 1 acquired in step S5 to decode the encrypted data encryption key 1 (step S36). In addition, the platform portal server 10 reads the encrypted artwork from the distributed file system 51 based on the hash value acquired in step S34 and uses the data encryption key 1 acquired in step S36, to decode the encrypted artwork (step S37).

Next, the platform portal server 10 generates a pair of the public key 2 and the secret key 2 (step S38). Further, the platform portal server 10 issues a purchase transaction including the purchaser information, the ID of the exhibition transaction, the amount of money, and the public key 2 to the contract account generated in steps S1 and S2 of FIG. 8 (step S39).

Next, the platform portal server 10 generates a QR code® from the ID of the purchase transaction (step S40), and executes a QR code® embedding process for embedding the generated QR code® into the artwork (step S41).

Figure 12:
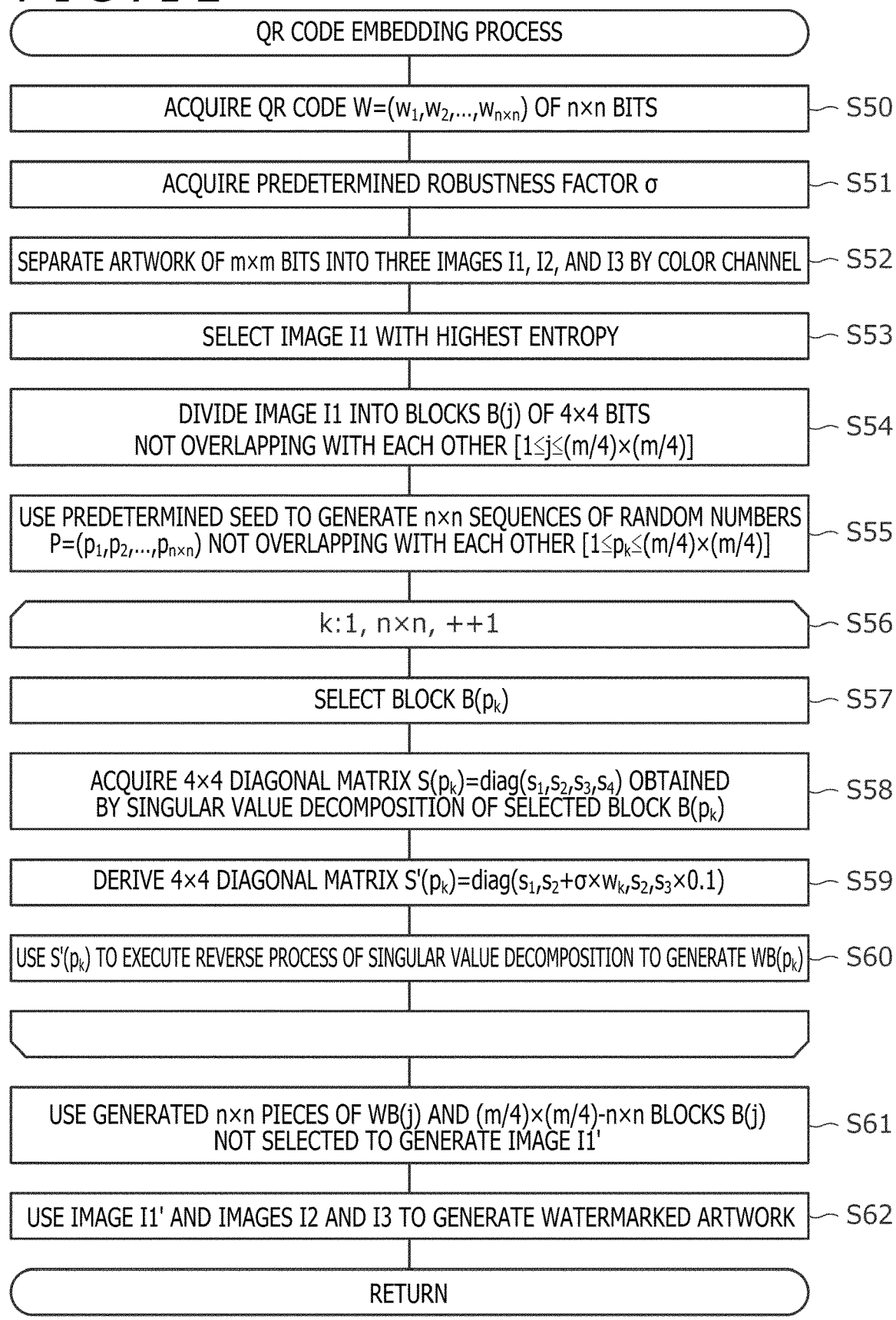
FIG. 12 is a diagram illustrating details of a process of embedding a QR code® executed in step S41 of FIG. 10.

FIG. 12 is a diagram illustrating details of the QR code® embedding process executed in step S41 of FIG. 10. Note that, while FIG. 12 illustrates an example of an approach using SVD (Singular Value Decomposition) (SVD Based Approach), other approaches may be used to execute the QR code® embedding process. Examples of the approaches include an approach using Discrete Cosine Transform or "DCT" (Optimal DCT-Psychovisual Threshold), an approach using encoding in a YCbCr color space (YCbCr Colour Space Encoding Approach), and an approach using multi-resolution analysis (Multi-resolution Wavelet Decomposition).

As illustrated in FIG. 12, the platform portal server 10 first acquires a QR code® $W=(w_1, w_2, \ldots, w_{n \times n})$ of n×n bits (step S50). Each of $w_1, w_2, \ldots$, and $w_{n \times n}$ is a value of 0 or 1.

Next, the platform portal server 10 acquires a predetermined robustness factor σ (step S51). The larger the value of the robustness factor σ is, the higher the restorability of the embedded QR code® is. On the other hand, the larger the value of the robustness factor σ is, the lower the image quality of the watermarked artwork is. Therefore, it is preferable to take the restorability of the QR code® and the image quality of the watermarked artwork into account to determine the optimal value of σ in advance.

Subsequently, the platform portal server 10 separates the artwork of m×m bits into three images I1, I2, and I3 by color channel (for example, red (Red), green (Green), and blue (Blue) images in RGB color model) (step S52). Further, the platform portal server 10 selects the image with highest entropy (that is, the image with most homogeneity and little variation) among the images I1, I2, and I3 (step S53). Here, the description will be continued by assuming that the entropy of the image I1 is the highest and that the image I1 is selected in step S53.

The platform portal server 10 that has selected the image I1 divides the image I1 into blocks B(j) of 4×4 bits not overlapping with each other (step S54), where $1 \leq j \leq (m/4) \times (m/4)$.

Next, the platform portal server 10 uses a predetermined seed to generate n×n sequences of random numbers $P=(p_1, p_2, \ldots, p_{n \times n})$ not overlapping with each other (step S55), where $1 \leq p_k \leq (m/4) \times (m/4)$. Further, the platform portal server 10 executes a process of steps S57 to S60 for each of integers k equal to or greater than 1 but equal to or smaller than n×n (step S56).

The process of steps S57 to S60 will be specifically described. The platform portal server 10 first selects a $p_k$th block $B(p_k)$ (step S57). Next, the platform portal server 10 acquires a 4×4 diagonal matrix $S(p_k)=\text{diag}(s_1, s_2, s_3, s_4)$ obtained by singular value decomposition of the selected block $B(p_k)$ (step S58). Note that the singular value decomposition is represented by $B(p_k)=U(p_k)S(p_k)V(p_k)^T$. Here, $U(p_k)$ and $V(p_k)$ represent 4×4 unitary matrices.

Further, the platform portal server 10 uses the robustness factor σ and bits $w_k$ to operate the diagonal matrix $S(p_k)$, thereby deriving a 4×4 diagonal matrix $S'(p_k)=\text{diag}(s_1, s_2+\sigma \times w_k, s_2, s_3 \times 0.1)$ (step S59). Further, the platform portal server 10 uses the derived $S'(p_k)$ to execute a reverse process of the singular value decomposition, thereby generating $WB(p_k)$ (step S60). Specifically, the platform portal server 10 performs calculation of $WB(p_k)=U(p_k)S'(p_k)V(p_k)^T$ to generate $WB(p_k)$.

Once the process of steps S57 to S60 is all completed, the platform portal server 10 uses the generated n×n pieces of WB(j) and (m/4)×(m/4)−n×n blocks B(j) not selected in step S57, to generate an image I1' (step S61). Specifically, the platform portal server 10 replaces n×n blocks B($p_1$) to B($p_{n \times n}$) of (m/4)×(m/4) blocks B(j) included in the image Ii, with WB($p_1$) to WB($p_{n \times n}$), respectively, to generate the image I1'.

Lastly, the platform portal server 10 uses the image I1' and the images I2 and I3 to generate watermarked artwork (step S62). Specifically, the platform portal server 10 combines the images I1', I2, and I3 to generate the watermarked artwork.

Returning to FIG. 10, the platform portal server 10 that has finished the QR code® embedding process generates a data encryption key 2, and uses the public key 2 to encrypt the data encryption key 2 (step S42). Further, as illustrated in FIG. 11, the platform portal server 10 stores the pair of the public key 2 and the secret key 2 and the encrypted data encryption key 2 in the secure key store 53 in association with the ID of the purchase transaction (step S43).

Next, the platform portal server 10 uses the data encryption key 2 to encrypt the watermarked artwork (step S44) and stores the encrypted watermarked artwork in the distributed file system 51 (step S45). Subsequently, the platform portal server 10 returns the hash value of the artwork with encrypted watermark, the ID of the purchase transaction, and the secret key 2 to the purchaser terminal 41 (step S46), and returns the ID of the purchase transaction and the proceeds to the artist terminal 40 (step S47). The platform portal server 10 then ends the artwork sale process.

Here, a QR code® reading process for reading the QR code® from the watermarked artwork will be described with reference to FIG. 13. FIG. 13 illustrates a process for reading the QR code® from the watermarked artwork generated in the QR code® embedding process illustrated in FIG. 12. When the watermarked artwork is generated in another type of QR code® reading process, obviously a reading process that corresponds to the process would be necessary. In addition, while the platform portal server 10 executes the QR code® reading process in the following description, another computer may execute the QR code® reading process in various implementations.

The platform portal server 10 first acquires a predetermined robustness factor σ (step S71). It is preferable that the robustness factor σ be the same value as the robustness factor σ acquired in step S51 of FIG. 12.

Then, the platform portal server 10 separates watermarked artwork of m×m bits into three images I1, I2, and I3 by color channel (step S71). Further, the platform portal server 10 selects the image with the highest entropy among the images I1, I2, and I3 (step S72). The process of steps S71 and S72 is the same process as steps S52 and S53 in FIG. 12. The description will also be continued here by assuming that the entropy of the image I1 is the highest and that the image I1 is selected in step S72.

The platform portal server 10 that has selected the image I1 divides the image I1 into blocks B(j) of 4×4 bits not overlapping with each other (step S73), where 1≤j≤(m/4)× (m/4). The process is also the same process as step S54 in FIG. 12.

Next, the platform portal server 10 uses a predetermined seed to generate n×n sequences of random numbers P=($p_1$, $p_2$, . . . , $p_{n \times n}$) not overlapping with each other (step S74), where 1≤$p_k$≤(m/4)×(m/4). The predetermined seed used in step S74 needs to be the same as the seed used in step S55 of FIG. 12. The QR code® cannot be read if the seed is not known, and therefore, the seed also functions as a kind of common key.

Then, the platform portal server 10 executes a process of steps S76 to S79 for each of integers k equal to or greater than 1 but equal to or smaller than n×n (step S75).

The process of steps S76 to S79 will be specifically described. The platform portal server 10 first selects a $p_k$th block B($p_k$) (step S76). Next, the platform portal server 10 acquires a 4×4 diagonal matrix S'($p_k$)=diag($s_1$, $s_2$', $s_3$', $s_4$') obtained by singular value decomposition of the selected block B($p_k$) (step S77). The singular value decomposition is represented by B($p_k$)=U($p_k$)S'($p_k$)V($p_k$)$^T$ as in step S58 of FIG. 12.

Next, the platform portal server 10 derives s2'-s3' (step S78). The value derived in this way is equal to σ×$w_k$ as is apparent from the derivation method of the diagonal matrix S'($p_k$) described in step S59 of FIG. 12. Therefore, the platform portal server 10 assigns 1 to $w_k$ if the derived value is equal to or greater than σ/2(σ×$w_k$≥σ/2), and assigns 0 to $w_k$ otherwise (step S79). In this way, kth $w_k$ is read.

Once the process of steps S76 to S79 is all completed, the platform portal server 10 acquires the QR code® W=($w_1$, $w_2$, . . . , $w_{n \times n}$) of n×n bits based on the read n×n pieces of $w_k$ (step S80). In this way, the reading of the QR code® W is completed.

As described above, according to the artwork transaction system 1 of the present embodiment, the biometric signature data including the signature of the artist is recorded as part of the exhibition transaction in the blockchain network 50, and this makes it possible to later check (confirm) that the exhibitor of the artwork is the artist himself or herself. In addition, the artwork in the encrypted state is stored in the distributed file system 51, and this can guarantee that the artwork has not been altered after the initial exhibition. Further, because the QR code® indicating the ID of the purchase transaction is embedded in the sold artwork, once the artwork is sold and then placed in a black market, the QR code® can be read from the distributed artwork to identify the purchaser who has released the artwork into the black market. Therefore, according to the artwork transaction system 1 of the present embodiment, the smart contract can be used to securely trade artwork.

Although the preferred embodiments of the present disclosure have been described, the present disclosure is not limited to the described embodiments, and the present disclosure can be carried out in various alternative modes without departing from the present disclosure.

For example, while the watermark embedded into the artwork to be sold is generated based on the ID of the purchase transaction in the example described above, the watermark may be generated based on other information. Specifically, for example, the watermark generation unit 26 may generate a watermark that comprises a QR code® or other bitmap representation, based on data acquired by the artist terminal 40 when the artist draws a digital image as artwork. Here, the "data acquired by the artist terminal 40 when the artist draws a digital image" is, for example, data included in a digital ink file generated according to the WILL™ digital ink protocol, described above. Specifically, examples of such data include one or more pieces of stroke data included in a digital image or a portion of a digital image, identification information of the artist terminal 40 used to generate the artwork, and the like. It is sufficient that the watermark generation unit 26 assigns the "data acquired by the artist terminal 40 when the artist draws a digital image" to a predetermined hash function to derive a hash value (a fingerprint of the "data acquired by the artist terminal 40 when the artist draws a digital image") and generates a watermark based on the derived hash value.

DESCRIPTION OF REFERENCE SYMBOLS

1 Artwork transaction system
2 Network
10 Platform portal server
11, 20 Reception unit
12 Overlap determination unit
13, 28 Artwork encryption processing unit
14, 29 Artwork storage processing unit
15, 24 Key pair generation unit
16, 25 Transaction issue unit
17, 30 Key encryption processing unit
18 Catalog generation unit
19, 31 Transmission unit
21 Purchase availability determination unit
22 Key decoding processing unit
23 Artwork decoding processing unit
26 Watermark generation unit
27 Watermark embedding processing unit
40 Artist terminal
41 Purchaser terminal
50 Blockchain network
51 Distributed file system
52 Catalog database
53 Secure key store
100 Computer
101 CPU
102 Storage device
103 Input device
104 Output device
105 Communication device

The invention claimed is:

1. A transaction method of uploading artwork, to be executed by a computer, the transaction method of uploading the artwork comprising:
receiving, by the computer, the artwork to be uploaded and biometric signature data, wherein the biometric signature data includes digital ink data of a signature of an artist who created the artwork, the digital ink data including a series of coordinate data forming a drawn line of the signature;
generating by the computer a contract account on a blockchain network;
subsequent to receiving the artwork and the biometric signature data and subsequent to generating the contract account, issuing by the computer an exhibition transaction to the contract account on the blockchain network, wherein the exhibition transaction includes information identifying the artwork and includes the biometric signature data; and
at a later point in time, confirming whether an uploader of the artwork is the artist by using the biometric signature data included in the exhibition transaction.

2. The transaction method of uploading artwork according to claim 1, further comprising:
determining by the computer whether or not the artwork overlaps with other artwork, wherein,
the exhibition transaction is issued when the computer determines that the artwork does not overlap with other artwork.

3. The transaction method of uploading artwork according to claim 1, further comprising:

applying by the computer a first data encryption key to encrypt the artwork; and
storing by the computer the encrypted artwork in a distributed file system.

4. The transaction method of uploading artwork according to claim 3, further comprising:
generating by the computer a pair of a first public key and a first secret key; and
applying by the computer the first public key to encrypt the first data encryption key.

5. The transaction method of uploading artwork according to claim 3, further comprising:
receiving by the computer an acquisition request indicating an acquisition of the artwork;
acquiring by the computer the encrypted artwork from the distributed file system and applying by the computer the first data encryption key to decode the encrypted artwork;
embedding by the computer a watermark into the decoded artwork; and
storing by the computer the artwork including the embedded watermark in the distributed file system.

6. The transaction method of uploading artwork according to claim 4, further comprising:
receiving by the computer an acquisition request indicating an acquisition of the artwork;
applying by the computer the first secret key to decode the first data encryption key;
acquiring by the computer the encrypted artwork from the distributed file system and applying by the computer the decoded first data encryption key to decode the encrypted artwork;
embedding by the computer a watermark into the decoded artwork; and
storing by the computer the artwork including the embedded watermark in the distributed file system.

7. The transaction method of uploading artwork according to claim 5, further comprising:
applying by the computer a second data encryption key to encrypt the artwork including the embedded watermark, wherein,
the encrypted artwork that includes the embedded watermark is stored in the distributed file system.

8. The transaction method of uploading artwork according to claim 7, further comprising:
generating by the computer a pair of a second public key and a second secret key; and
applying by the computer the second public key to encrypt the second data encryption key.

9. The transaction method of uploading artwork according to claim 5, further comprising:
determining by the computer whether or not the acquisition request is approvable; and
issuing by the computer an acquisition transaction to the contract account on the blockchain network when the acquisition request is determined to be approvable, wherein the acquisition transaction includes information regarding an acquirer who has issued the acquisition request and includes identification information of the exhibition transaction.

10. The transaction method of sharing uploading artwork according to claim 9, further comprising:
generating by the computer the watermark based on identification information of the acquisition transaction.

11. The transaction method of uploading artwork according to claim 5, further comprising:

generating by the computer the watermark based on data acquired when the artwork is created.

12. An artwork transaction apparatus for uploading artwork, comprising:
a reception circuit configured to receive the artwork to be uploaded and biometric signature data, wherein the biometric signature data includes digital ink data of a signature of an artist who created the artwork, the digital ink data including a series of coordinate data forming a drawn line of the signature; and
a first transaction issue circuit configured to:
generate a contract account on a blockchain network,
subsequent to the reception circuit receiving the artwork and the biometric signature data and subsequent to the first transaction issue circuit generating the contract account, issue an exhibition transaction to the contract account on the blockchain network, wherein the exhibition transaction includes information identifying the artwork and includes the biometric signature data, and
at a later point in time, confirm whether an uploader of the artwork is the artist by using the biometric signature data included in the exhibition transaction.

13. The artwork transaction apparatus according to claim 12, further comprising:
an overlap determination circuit configured to determine whether or not the artwork overlaps with other artwork, wherein
the first transaction issue circuit issues the exhibition transaction responsive to the overlap determination circuit determining that the artwork does not overlap with other artwork.

14. The artwork transaction apparatus according to claim 12, further comprising:
a first artwork encryption processing circuit configured to apply a first data encryption key to encrypt the artwork; and
a first artwork storage processing circuit configured to store the encrypted artwork in a distributed file system.

15. The artwork transaction apparatus according to claim 14, further comprising:
a first key pair generation circuit configured to generate a pair of a first public key and a first secret key; and
a first key encryption processing circuit configured to apply the first public key to encrypt the first data encryption key.

16. The artwork transaction apparatus according to claim 14, further comprising:
a second reception circuit configured to receive an acquisition request indicating an acquisition of the artwork;
an artwork decoding processing circuit configured to receive the encrypted artwork from the distributed file system and apply the first data encryption key to decode the encrypted artwork;
a watermark embedding processing circuit configured to embed a watermark into the decoded artwork; and
a second artwork storage processing circuit configured to store the artwork including the embedded watermark in the distributed file system.

17. The artwork transaction apparatus according to claim 15, further comprising:
a second reception circuit configured to receive an acquisition request indicating an acquisition of the artwork;
a key decoding processing circuit configured to apply the first secret key to decode the first data encryption key;
an artwork decoding processing circuit configured to acquire the encrypted artwork from the distributed file system and apply the decoded first data encryption key to decode the encrypted artwork;
a watermark embedding processing circuit configured to embed a watermark into the decoded artwork; and
a second artwork storage processing circuit configured to store the artwork including the embedded watermark in the distributed file system.

18. The artwork transaction apparatus according to claim 16, further comprising:
a second artwork encryption processing circuit configured to apply a second data encryption key to encrypt the artwork including the embedded watermark, wherein
the second artwork storage processing circuit stores, in the distributed file system, the encrypted artwork that includes the embedded watermark.

19. The artwork transaction apparatus according to claim 18, further comprising:
a second key pair generation circuit configured to generate a pair of a second public key and a second secret key; and
a second key encryption processing circuit configured to apply the second public key to encrypt the second data encryption key.

20. The artwork transaction apparatus according to claim 16, further comprising:
an acquisition availability determination circuit configured to determine whether or not the acquisition request is approvable; and
a second transaction issue circuit configured to issue an acquisition transaction to the contract account on the blockchain network responsive to the acquisition availability determination circuit determining that the acquisition request is approvable, wherein the acquisition transaction includes information regarding an acquirer who has issued the acquisition request and includes identification information of the exhibition transaction.

21. The artwork transaction apparatus according to claim 20, further comprising:
a watermark generation circuit configured to generate the watermark based on identification information of the acquisition transaction.

22. The artwork transaction apparatus according to claim 16, further comprising:
a watermark generation circuit configured to generate the watermark based on data acquired when the artwork is created.

23. A non-transitory computer-readable medium comprising a computer-executable program and configured to cause a computer to function as an artwork transaction apparatus for uploading artwork, the medium causing the computer to perform:
receiving the artwork to be uploaded and biometric signature data, wherein the biometric signature data includes digital ink data of a signature of an artist who created the artwork, the digital ink data including a series of coordinate data forming a drawn line of the signature;
generating a contract account on a blockchain network;
subsequent to receiving the artwork and the biometric signature data and subsequent to generating the contract account, issuing an exhibition transaction to the contract account on the blockchain network, wherein the exhibition transaction includes information identifying the artwork and includes the biometric signature data; and at a later point in time, confirming whether an uploader of the artwork is the artist by using the biometric signature data included in the exhibition transaction.

24. The medium according to claim 23, further causing the computer to perform:
determining whether or not the artwork overlaps with other artwork, wherein,
the exhibition transaction is issued when the computer determines that the artwork does not overlap with other artwork.

25. The medium according to claim 23, further causing the computer to perform:
applying a first data encryption key to encrypt the artwork; and
storing the encrypted artwork in a distributed file system.

26. The medium according to claim 25, further causing the computer to perform:
generating a pair of a first public key and a first secret key; and
applying the first public key to encrypt the first data encryption key.

27. The medium according to claim 25, further causing the computer to perform:
receiving an acquisition request indicating an acquisition of the artwork;
reading the encrypted artwork from the distributed file system and applying the first data encryption key to decode the encrypted artwork;
embedding a watermark into the decoded artwork; and
storing the artwork including the embedded watermark in the distributed file system.

28. The medium according to claim 26, further causing the computer to perform:
receiving an acquisition request indicating an acquisition of the artwork;
applying the first secret key to decode the first data encryption key;
reading the encrypted artwork from the distributed file system and applying the decoded first data encryption key to decode the encrypted artwork;
embedding a watermark into the decoded artwork; and
storing the artwork including the embedded watermark in the distributed file system.

29. The medium according to claim 27, further causing the computer to perform:
applying a second data encryption key to encrypt the artwork including the embedded watermark, wherein,
the encrypted artwork including the embedded watermark is stored in the distributed file system.

30. The medium according to claim 29, further causing the computer to perform:
generating a pair of a second public key and a second secret key; and
applying the second public key to encrypt the second data encryption key.

31. The medium according to claim 27, further causing the computer to perform:
determining whether or not the acquisition request is approvable; and
issuing an acquisition transaction to the contract account on the blockchain network when the acquisition request is determined to be approvable, wherein the acquisition transaction includes information regarding an acquirer who has issued the acquisition request and includes identification information of the exhibition transaction.

32. The medium according to claim 31, further causing the computer to perform:
generating the watermark based on identification information of the acquisition transaction.

33. The medium according to claim 27, further causing the computer to perform:
generating the watermark based on data acquired when the artwork is created.

* * * * *